(12) United States Patent
Gonzales et al.

(10) Patent No.: US 10,783,050 B2
(45) Date of Patent: Sep. 22, 2020

(54) LIGHT COLOR ADJUSTMENT OF A SERVER PANEL LIGHT

(71) Applicant: HEWLETT PACKARD ENTERPRISE DEVELOPMENT LP, Houston, TX (US)

(72) Inventors: Daniel Ross Gonzales, Houston, TX (US); James Jeffery Schulze, Houston, TX (US); Gennadiy Rosenberg, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/572,253

(22) PCT Filed: Jun. 4, 2015

(86) PCT No.: PCT/US2015/034283
§ 371 (c)(1),
(2) Date: Nov. 7, 2017

(87) PCT Pub. No.: WO2016/195697
PCT Pub. Date: Dec. 8, 2016

(65) Prior Publication Data
US 2018/0121308 A1    May 3, 2018

(51) Int. Cl.
*H05B 33/08* (2020.01)
*G06F 11/32* (2006.01)
*H04L 12/24* (2006.01)
*H05B 45/24* (2020.01)

(52) U.S. Cl.
CPC ............ *G06F 11/325* (2013.01); *G06F 11/32* (2013.01); *H04L 41/0853* (2013.01); *H05B 45/24* (2020.01)

(58) Field of Classification Search
CPC ............ H05B 33/0845; H05B 33/0857; H05B 33/0866; G06F 11/325; G06F 11/326; G06F 11/328; G06F 11/3044
USPC ........................................................ 315/312
See application file for complete search history.

(56) References Cited

U.S. PATENT DOCUMENTS

| | | |
|---|---|---|
| 6,779,134 B1 | 8/2004 | Laviolette et al. |
| 8,046,694 B1 | 10/2011 | Lappas et al. |
| 8,300,853 B2 | 10/2012 | Aiso |
| 8,829,820 B2 * | 9/2014 | Roberts ................. H05B 45/22 315/309 |
| 8,928,454 B2 | 1/2015 | Brown et al. |
| 9,125,274 B1 * | 9/2015 | Brunault ............ H05B 37/0281 |
| 2005/0179554 A1 | 8/2005 | Lu |
| 2007/0035706 A1 | 2/2007 | Margulis |

(Continued)

OTHER PUBLICATIONS

Texas Instruments, LM3535 Multi-Display LED Driver with Ambient Light Sensing and Dynamic Backlight Control Compatibility, (Research Paper), Aug. 2010, 34 pages.

(Continued)

*Primary Examiner* — Tung X Le
(74) *Attorney, Agent, or Firm* — Hewlett Packard Enterprise Patent Department

(57) ABSTRACT

In some examples, a method may be performed through light adjustment circuitry of a server that includes a panel light. The method may include identifying a server version of the server from a hardware configuration detected for the server and adjusting a light color of the panel light to account for a lighting variance characteristic of the server version.

15 Claims, 6 Drawing Sheets

(56) References Cited

U.S. PATENT DOCUMENTS

| | | | |
|---|---|---|---|
| 2009/0154159 A1* | 6/2009 | Graybill | F21K 9/00 362/249.02 |
| 2011/0066895 A1* | 3/2011 | Windell | H04L 41/0645 714/43 |
| 2011/0078239 A1 | 3/2011 | Heen et al. | |
| 2011/0239056 A1* | 9/2011 | Adams | G06F 11/328 714/48 |
| 2014/0028219 A1* | 1/2014 | Chen | H05B 33/089 315/297 |
| 2014/0293038 A1 | 10/2014 | Delmonico et al. | |
| 2014/0300283 A1 | 10/2014 | Lee et al. | |
| 2015/0035437 A1* | 2/2015 | Panopoulos | F21V 14/02 315/112 |

OTHER PUBLICATIONS

International Search Report & Written Opinion received in PCT Application No. PCT/US2015/034283, dated Feb. 24, 2016, 11 pages.

* cited by examiner

LIGHT COLOR ADJUSTMENT OF A SERVER PANEL LIGHT

BACKGROUND

With rapid advances in technology, computing systems are widely prevalent in society today. Vast computing systems execute and support applications that communicate and process immense amounts of data, and the physical number of computing devices in use today is continually increasing. Increasing the capability and function of computing systems will further improve user experience.

BRIEF DESCRIPTION OF THE DRAWINGS

Certain examples are described in the following detailed description and in reference to the drawings.

DETAILED DESCRIPTION

Industrial design specifications may specify light color guidelines to maintain customer perceived uniformity across servers of different versions, including of various server types and platforms. If a panel light is not tuned to a specific color or brightness, the panel lighting of a server may appear inconsistent with other panel lights or even appear to be a different color entirely. These lighting inconsistencies may become increasingly noticeable when multiple servers are stacked together in a chassis, rack, or enclosure.

The description herein may provide circuitry, devices, systems, logic, and methods for dynamic light color adjustments of a server panel light. As described in greater detail below, light adjustment circuitry of a server may adjust the light color of a server panel light to maintain light color uniformity amongst multiple, different servers. In that regard, the light adjustment circuitry may adjust a light color based on a particular hardware configuration or server version, accounting for a lighting variance characteristic of the server. The light adjustment circuitry may provide a flexible, efficient, and cost-effective mechanism to maintain uniformity amongst different hardware and server versions, while also providing increased production efficiencies and simplifying supply chain operations.

Figure 1:
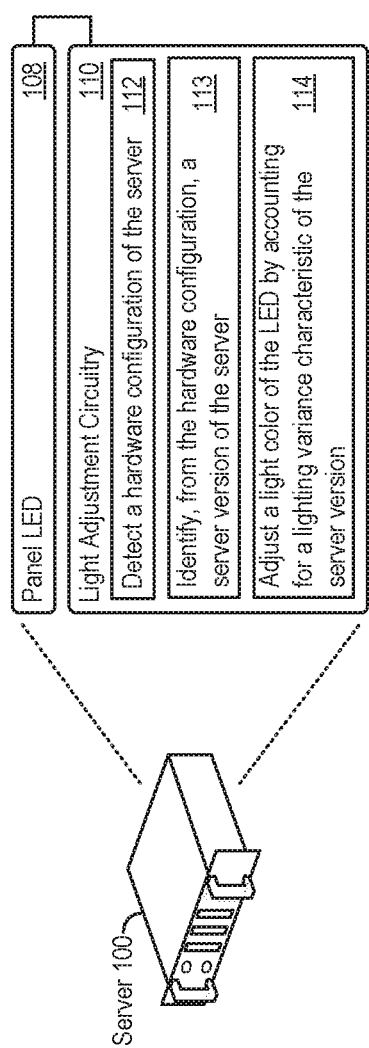
FIG. 1 shows an example of a server that supports light color adjustment of a server panel light.

FIG. 1 shows an example of a server 100 that supports light color adjustment of a server panel light. The server 100 may be any computing device that processes or shares data for a client device or process. The server 100 may take the form of any physical computing device providing client serving capabilities, for example as a web server, exchange server, cloud server, print server, routing or networking device, and more.

The server 100 may include panels as part of a physical enclosure of the server 100. For instance, the server 100 may include a front panel and a rear panel, which may be externally visible when the server 100 is mounted or stacked in a chassis or rack. Server panels may provide various data interfaces or user interfaces, and may thus include visual indicators as to a particular status or state of the server 100 or component thereof. In that regard, the server 100 may include any number of panel lights, which the server 100 may implement as a light-emitting diodes (LEDs). In the example shown in FIG. 1, the server 100 includes a panel LED 108.

The server 100 may include light adjustment circuitry 110. The light adjustment circuitry 110 may be implemented by the server 100 as dedicated hardware, executable instructions stored on a machine readable medium, or in various other forms. The server 100 may implement the light adjustment circuitry 110 as part of a server motherboard, printed circuit board (PCB), PCB assembly, field programmable gate array (FPGA), or other integrated circuit (IC) in the server 100. Thus, the light adjustment circuitry 110 may be part of the server 100 itself.

The light adjustment circuitry 110 may dynamically adjust a light color of a server panel light, such as the panel LED 108 of the server 100. In the example shown in FIG. 1, the light adjustment circuitry 110 includes the sub-circuitry labeled as 112, 113, and 114. The sub-circuitries 112, 113, and 114 may take the form of hardware, executable instructions stored on a machine-readable medium, or any other form the light adjustment circuitry 110 takes. Through the sub-circuitries 112, 113, and 114, the light adjustment circuitry 110 may detect a hardware configuration of the server 100; identify, from the hardware configuration, a server version of the server 100; and adjust a light color of the panel LED 108 by accounting for a lighting variance characteristic of the server version.

Figure 2:
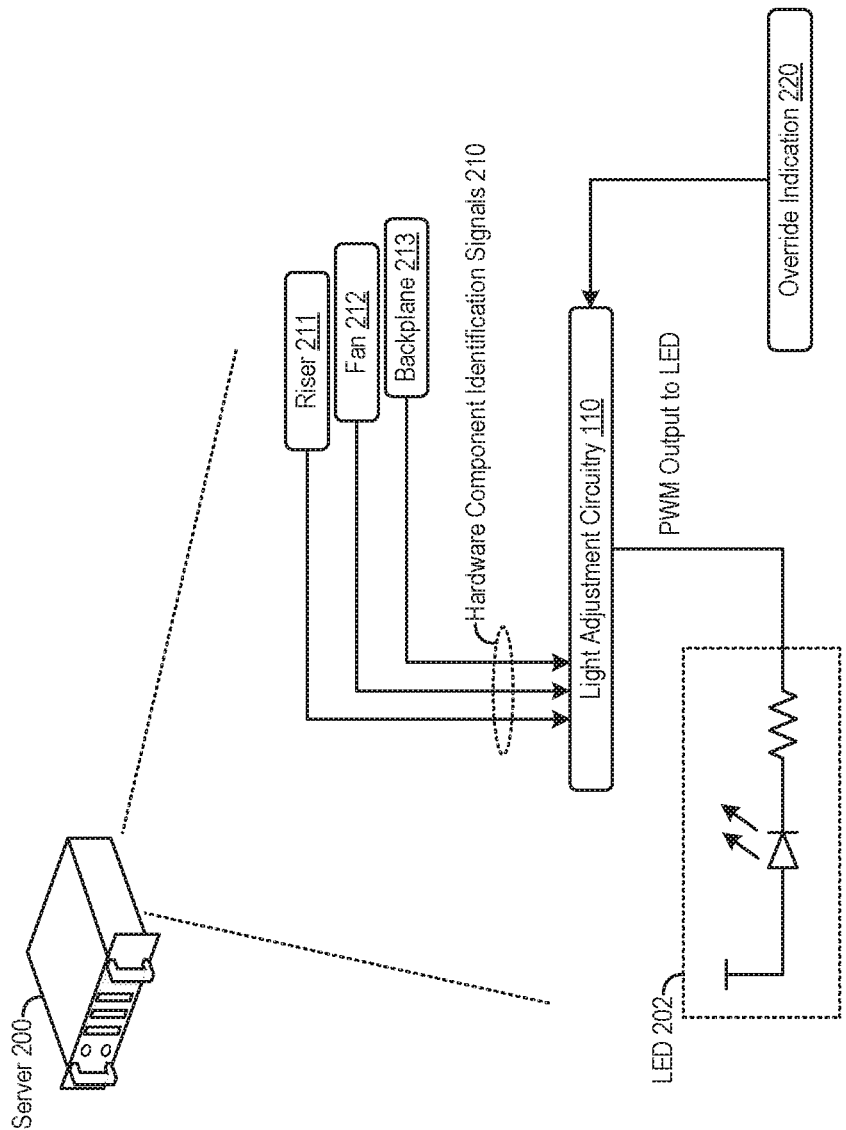
FIG. 2 shows an example of a light color adjustment by light adjustment circuitry.

Some example features of the light adjustment circuitry 110 are explained in greater detail in FIG. 2, which shows an example of a light color adjustment by the light adjustment circuitry 110. In FIG. 2, a server 200 includes light adjustment circuitry 110 and a panel light in the form of an LED 202. The light adjustment circuitry 110 may dynamically adjust a light color of the LED 202. To adjust the light color of the LED 202, the light adjustment circuitry 110 may determine a server version of the server 200 that the LED 202 and light adjustment circuitry 110 are part of.

A server version may refer to a categorization type of a server. The light adjustment circuitry 110 may determine a server version of a particular server according to any number of categorization criteria. For example, the light adjustment circuitry 110 may differentiate between versions of servers according to server platform, e.g., differentiated families of servers based on certain hardware of software characteristics (e.g., processor instruction set architecture, operating system, etc.). Different server models may form the basis of categorization criteria as well, such as high-performance, mission critical, or cost-efficient server models. As another example of categorization criteria for server versions, the light adjustment circuitry 110 may differentiate between versions of servers based on hardware component sourcing, such as differentiation according to a particular manufacturer or supplier that provided particular server components. To illustrate, the light adjustment circuitry 110 may differentiate between servers that include the same particular hardware component (e.g., a panel LED or other light circuitry) but sourced from different vendors or manufacturers.

The light adjustment circuitry 110 may determine a server version of the server 200 according to a detected hardware configuration of the server 200. The light adjustment circuitry 110 may detect a hardware configuration of the server 200 by identifying the presence of particular hardware components in the server 200 or particular versions of the hardware components present in the server 200. To identify particular hardware components or component versions, the light adjustment circuitry 110 may receive a hardware component identification signal from various hardware components of the server 200. In the example shown in FIG. 2, the light adjustment circuitry 110 receives the hardware component identification signals 310 from a riser 211, fan 212, and backplane 213 of the server. The particular hardware components that the light adjustment circuitry 110 may receive identification signals from may be configured among any server component. In particular, the light adjustment circuitry 110 may receive identification signals from specific hardware components that differ between server versions, either in presence or version.

The light adjustment circuitry 110 may receive a hardware component identification signal directly from a particular hardware component. For example, the light adjustment circuitry 110 may link to various hardware components of the server through communication channels or device interfaces, through which the light adjustment circuitry 110 may query for or receive hardware component identification signals. A hardware component identification signal may indicate to the light adjustment circuitry 110 that the particular hardware component is present in the server 200, as different server versions may include different hardware components (e.g., a particular server version including a riser but a different server version not including any risers). The hardware component identification signal may also specify a particular version of a particular hardware component that is present in the server 200, thus allowing the light adjustment circuitry 110 to differentiate server versions based on hardware component versions. Hardware component versions may be identified through product numbers or codes, through which the light adjustment circuitry 110 may determine the hardware configuration of the server 200. Upon detecting a particular hardware configuration of the server 200, the light adjustment circuitry 110 may determine server version that corresponds to the detected hardware configuration.

By identifying a server version of the server 200, the light adjustment circuitry 110 may identify server characteristics of the server 200 that may affect the light color of the LED 202. Different server versions may include different hardware components or hardware components from different manufacturers or vendors. These differences in hardware components may result in variance in the color lighting of servers of different server versions. To illustrate, the specific hardware components used to implement the LED 202 or other lighting circuitry of a server may affect the color output of the LED 202. Differences between mechanical light piping, cable connections, LED components, or other lighting circuitry among multiple servers of different server versions may cause unintended color variations between servers with different hardware components. Thus, multiple servers with differing lighting components may output a green LED color for respective panel LEDs, but the green LED color may appear differently due to lighting variances for different server versions. A lighting variance for a particular server version may be referred to as a lighting variance characteristic of the particular server version.

A lighting variance characteristic of a server version may cause a panel LED to emit light offset from a target color, e.g., variance caused by the particular hardware components of the server version. One way to address the lighting variance characteristic for a particular server version is by physically altering the hardware components of a server, such as by using a current-limiting resistor of a specific resistor value for the panel LED to address the lighting variance characteristic and output the target light color. However, such a solution may require specific physical components that differ for different server versions. In some scenarios, each server version may require a separate PCB assembly with a particular LED resistor specific to that server version to provide uniform light coloring amongst the different server versions. Thus, physical altering may limit hardware sharing amongst different server versions and subsequent changes in component specifications or vendors may require additional updates to the current-limiting resistor or other server components, increasing the complexity of the supply chain operations, bill of materials generation, and assembly processes.

The light adjustment circuitry 110 may support uniform light coloring amongst different server versions without having to physically change hardware components. Put another way, the light adjustment circuitry 110 may dynamically adjust the light color of a panel LED for any server version regardless of LED sourcing, mechanical light piping versions, and the like. With the light adjustment capabilities provided by the light adjustment circuitry 110, a PCB assembly or server motherboard may include a current-limiting resistor with a set value, without having to adjust or physically integrate different resistors for different server versions. Thus, a common PCB assembly or server motherboard useable for multiple, different server versions may allow for increased hardware and production efficiency. Regarding a resistance value of a commonly shared PCB assembly, the LED resistor may have a resistor value providing a highest LED brightness, and the light adjustment circuitry 110 may adjust the light color of the LED to any target color, e.g., through pulse width modulation (PWM).

Upon determining a particular server version of the server 200, the light adjustment circuitry 110 may account for a lighting variance characteristic of the particular server version. For example, an industrial design specification may specify that server LEDs output a green LED coloring of a particular wavelength or within a particular wavelength range. In this example, the light adjustment circuitry 110 may account for a lighting variance characteristic of the particular server version by adjusting the light color of the LED 202 to the particular color wavelength specified by the industrial design specification.

The specific light adjustment for the LED 202 to emit light of the particular color wavelength may offset the effects of the lighting variance characteristic of a particular server version. In that regard, the light adjustment circuitry 110 may access light adjustment data indicative of a particular light tuning adjustment to perform for the LED 202 to account for the lighting variance characteristic. The light adjustment data may indicate a particular brightness adjustment, power variance, or other light altering effect to effectuate in order to tune the light color of the LED 202 to the predetermined color set by a design specification or other specified color. As another example, the light adjustment circuitry 110 may account for a lighting variance characteristic of the particular server version of the server 200 by adjusting the light color of the LED 202 to match a panel light of a different server proximate to the server 200.

In some examples, the light adjustment circuitry 110 tunes the color of the LED 202 through pulse width modulation (PWM). Upon detecting a particular server version of the server 200, the light adjustment circuitry 110 may identify a duty cycle to output to the LED 202 to adjust the light color of the LED 202 to a target color. The light adjustment circuitry 110 (or another remote entity) may provide an adjustment table that pairs server versions to corresponding light adjustment data, such as a corresponding PWM duty cycle to output for respective server versions. The light adjustment circuitry 110 may perform a look up of the particular PWM duty cycle to output for a determined server version of the server 200, and adjust the light color of the LED 202 accordingly. Thus, the light adjustment circuitry 110 may adjust the light color of the LED 202 to account for a lighting variance characteristic of the server version of the server 200.

The light adjustment circuitry 110 may receive an override indication, which may specify a custom setting for the light color of the LED 202. In the example shown in FIG. 2, the light adjustment circuitry 110 receives the override indication 220, which may be a message, packet, or other communication from an entity external to the light adjustment circuitry 110. The override indication 220 may be provided by a user through a user interface implemented by or linked to the server 200. As another example, the light adjustment circuitry 110 may receive the override indication 220 from a system administrator or control entity through a communication link between the server 200 and a control device.

The override indication 220 may cause the light adjustment circuitry 110 to adjust the light color of the LED 202 to a target color or brightness specified by the override indication 220. In response to receiving the override indication 220, the light adjustment circuitry 110 may change the light color of the LED 202 according to the override indication 220 instead of or in combination with a light color adjustment accounting for the lighting variance characteristic of the determined server version for the server 200.

Through the light adjustment features discussed above, the light adjustment circuitry 110 may control light coloring of a panel LED of a server. By supporting override capabilities, the light adjustment circuitry 110 may provide flexibility in setting panel LED colors to a custom coloring or brightness. The light adjustment circuitry 110 may also efficiently adjust a panel LED for any number of server versions to provide color uniformity and consistency to meet an industrial design specification or match other panel LEDs of other servers.

Figure 3:
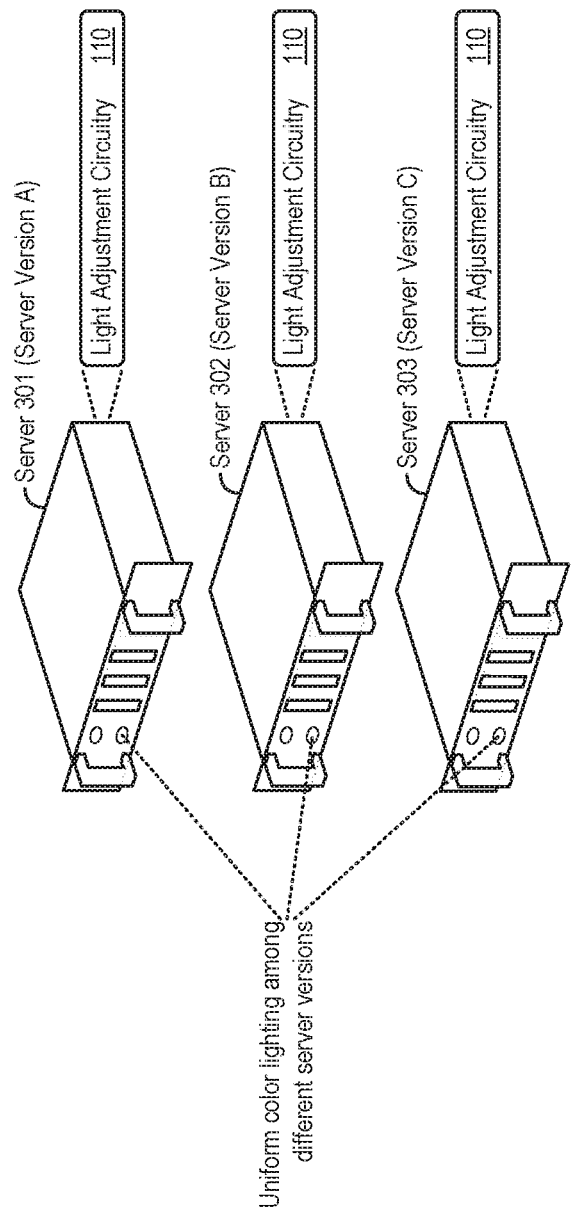
FIG. 3 shows an example of multiple servers providing uniform light coloring through light color adjustments by light adjustment circuitry.

FIG. 3 shows an example of multiple servers providing uniform light coloring through light color adjustments by light adjustment circuitry. In the example shown in FIG. 3, the servers 301, 302, and 303 include respective instances of light adjustment circuitry 110. The servers 301, 302, and 303 may also in hardware component versions or have particular components sourced from differing vendors. As such, the servers 301, 302, and 303 may differ in server version, e.g., as server versions A, B, and C as shown in FIG. 3. The difference in server versions between the servers 301, 302, and 303 may cause lighting variances between respective panel LEDs of the servers 301, 302, and 303. However, the lighting adjustment circuitry 110 of the servers 301, 302, and 303 may adjust the light color of the panel LEDs to provide a uniform light coloring among the different server versions.

To illustrate with respect to the server 301, the light adjustment circuitry 110 may identify server version A as the server version of the server 301 based on a detected hardware configuration for the server 301. In response, the light adjustment circuitry 110 may set the light color of a panel LED of the server 301 to a predetermined color (e.g., a green color in a target wavelength range as set by an industrial design specification). In doing so, the light adjustment circuitry 110 may account for a lighting variance characteristic of server version A by outputting a specific PWM duty cycle to the panel LED to set the light color of the panel LED to the predetermined color. Thus, the light adjustment circuitry 110 may access light adjustment data in the form of the PWM duty cycle for server version A. In a similar way, the light adjustment circuitry 110 of the servers 302 and 303 may set the light color of respective panel LEDs to the predetermined color as well, accounting for lighting variance characteristics of server versions B and C respectively. Thus, for different server versions, light adjustment circuitry 110 of the servers 301, 302, and 303 may adjust the light colors of panel LEDs to provide a uniform and consistent color lighting for the different servers.

Figure 4:
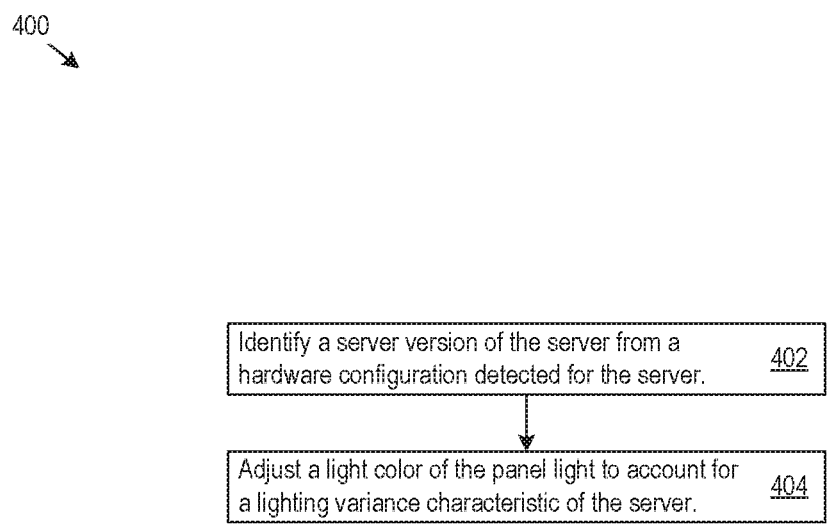
FIG. 4 shows an example of logic that a server may implement to support light color adjustment of a server panel light.

FIG. 4 shows an example of logic 400 that a server may implement to support light color adjustment of a server panel light. The server may implement the logic 400 as circuitry, executable instructions stored on a machine-readable medium, or various in other forms. In some examples, the server implements the logic 400 through light adjustment circuitry 110, and the light adjustment circuitry 110 may perform or execute the logic 400 as a method to provide light color adjustment of a server panel light.

The light adjustment circuitry 110 may be part of a server that includes a panel light, such as a panel LED. In performing or executing the logic 400, the light adjustment circuitry 110 may identify a server version from a hardware configuration detected for the server (402), including through any of the features described above. Then, the light adjustment circuitry 110 may adjust a light color of the panel light to account for a lighting variance characteristic of the server. As described above, the light adjustment circuitry 110 may adjust the light color to a predetermined color set by a design specification or to match other panel lights from different servers (e.g., enclosed together in the same chassis or rack).

Figure 5:
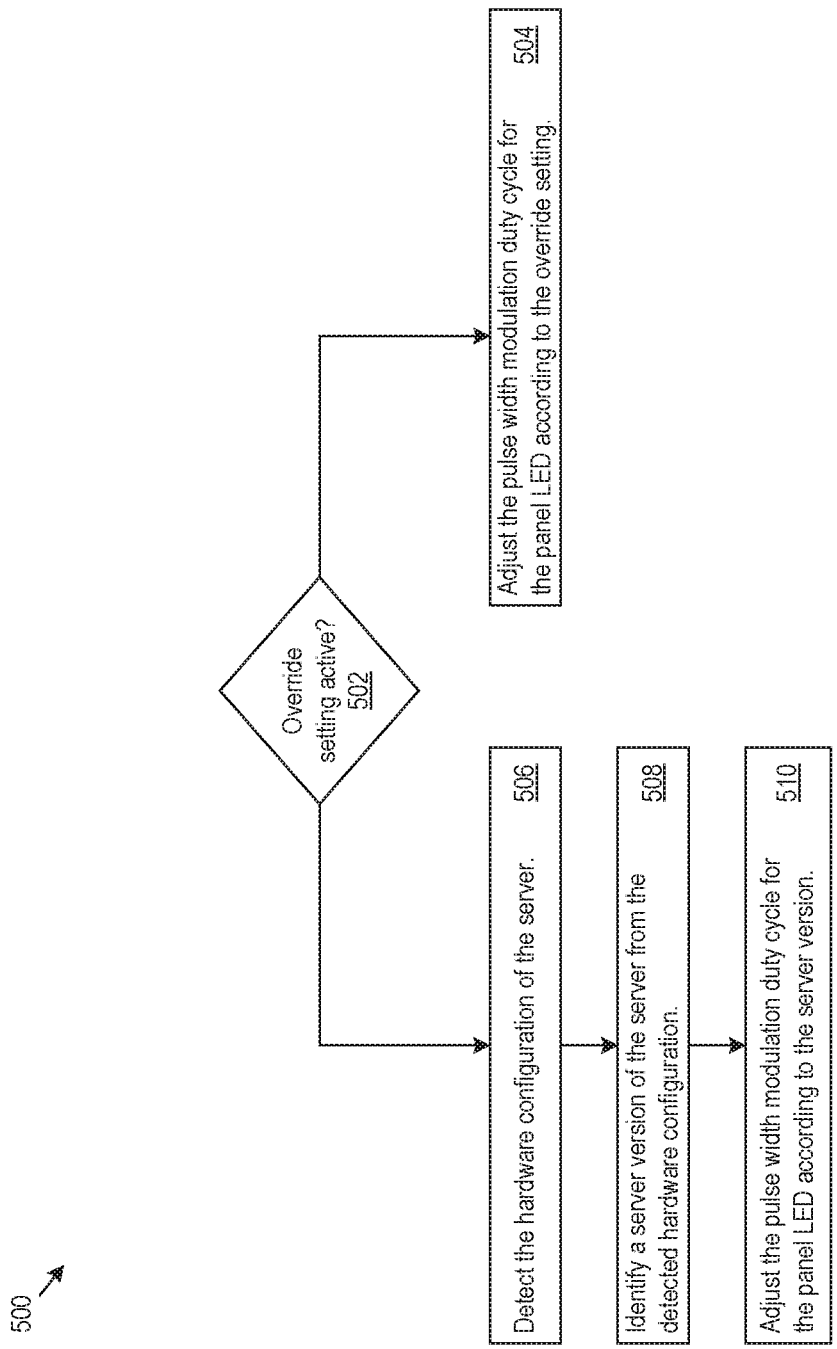
FIG. 5 shows another example of logic that a server may implement to support light color adjustment of a server panel light.

FIG. 5 shows another example of logic 500 that a server may implement to support light color adjustment of a server panel light. The server may implement the logic 500 as circuitry, executable instructions stored on a machine-readable medium, or various in other forms. In some examples, the server implements the logic 500 through light adjustment circuitry 110, and the light adjustment circuitry 110 may perform or execute the logic 500 as a method to provide light color adjustment of a server panel light. In particular, the light adjustment circuitry 110 may execute or perform the logic 500 to dynamically adjust the light color of a panel LED for a server.

The light adjustment circuitry 110 may determine whether an override setting for the panel LED of the server is active or not (502). An override setting may be set as active through an override indication from a user or system administrator, for example. In other examples, the light adjustment circuitry 110 may determine the override setting is active at particular time periods, when server resource usage exceeds a predetermined threshold (e.g., instantaneously or cumulatively over a period of time), through environment triggers (e.g., when ambient light surrounding a server panel is less than or greater than a light threshold), or according to any other configurable criteria.

When the override setting is active, the light adjustment circuitry 110 may adjust a light color of the panel LED by adjusting a PWM duty cycle for the panel LED according to the override setting (504). The override setting may specify a target color or brightness to set the panel LED to. The override setting may indicate a custom coloring for the panel LEDs of multiple servers, and thus the light adjustment circuitry 110 may set the panel LED to a specified custom color consistent with other surrounding servers.

In some examples, the override setting specifies the override setting as a brightness percentage of normal operation. For example, the override setting may indicate a 50% LED brightness to dim the panel LED during power conservation time periods or 110% of LED brightness to increase the light output when the ambient light surrounding the server panel decreases. As another feature, the override setting may indicate shutting down the LED with a 0% brightness to turn off the LED.

When an override setting for the panel LED of the server is not active, the light adjustment circuitry 110 may detect a hardware configuration of the server (506) and identify a server version of the server from the detected hardware configuration (508). The light adjustment circuitry 110 may do so in any of the ways described above. Upon identifying the server version, the light adjustment circuitry 110 may adjust the light color of the pane LED according to the server version. To do so, the light adjustment circuitry 110 may adjust a PWM duty cycle for the panel LED according to the server version (510).

Figure 6:
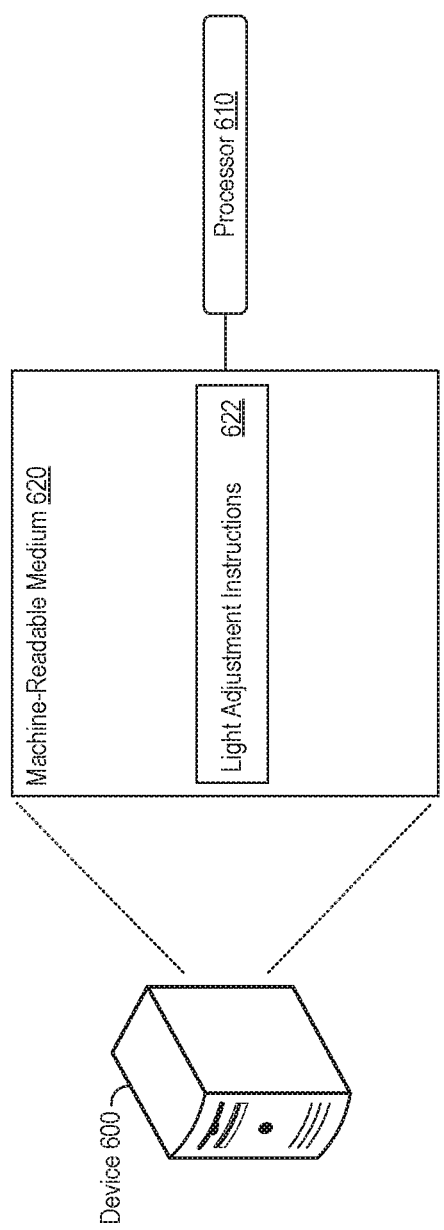
FIG. 6 shows an example of a device that supports light color adjustment of a server panel light.

FIG. 6 shows an example of a device 600 that supports light color adjustment of a server panel light. The device 600 may be an FPGA, motherboard, or other circuitry part of a server, for example. The device 600 may include a processor 610. The processor 610 may include a central processing unit (CPU), microprocessor, and/or any hardware device suitable for executing instructions stored on a machine-readable medium.

The device 600 may include a machine-readable medium 620. The machine-readable medium 620 may be any non-transitory electronic, magnetic, optical, or other physical storage device that stores executable instructions, such as the light adjustment instructions 622 shown in FIG. 6. Thus, the machine-readable medium 620 may be, for example, Random Access Memory (RAM), an Electrically-Erasable Programmable Read-Only Memory (EEPROM), a storage drive, an optical disk, and the like.

The device 600 may execute instructions stored on the machine-readable medium 620 through the processor 610. Executing the instructions may cause the processor 610 to perform or support any combination of the features described herein, including any features of the light adjustment circuitry described above. To illustrate, executing the light adjustment instructions 622 may cause the processor 610 to detect a hardware configuration for a server by identifying a particular hardware component is present in the server; identify a server version for the server through the detected hardware configuration; and adjust a light color of a panel light of the server to account for a lighting variance characteristic of the server version. The processor 610 may adjust the light color of the panel light to a predetermined color to match a panel light of a different server or as set by a design specification.

In some examples, executing the light adjustment instructions 622 causes the processor 610 to identify the particular hardware component as present in the server by receiving a hardware component identification signal from the particular hardware component of the server. As another example, executing the light adjustment instructions 622 may further cause the processor 610 to receive a custom override indication specifying an override light color to set the panel light to and adjust the light color to the override light color instead of the predetermined color set by a design specification.

The methods, devices, systems, circuitry, and logic described above, including the light adjustment circuitry 110, may be implemented in many different ways in many different combinations of hardware, executable instructions stored on a machine-readable medium, or both. For example, the light adjustment circuitry 110 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above.

The processing capability of the systems, devices, and circuitry described herein, including the light adjustment circuitry 110, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various examples have been described above, many more implementations are possible.

The invention claimed is:

1. A method for a server including a panel light, comprising:
    identifying, by a light adjustment circuitry included within the server, a server version of the server from a hardware configuration detected for the server; and
    adjusting, by the light adjustment circuitry, a light color of the panel light to account for a lighting variance characteristic of the server version.

2. The method of claim 1, wherein adjusting comprises adjusting the light color to a predetermined color to match a panel light of a different server.

3. The method of claim 1, wherein adjusting comprises adjusting the light color to a predetermined color set by a design specification.

4. The method of claim 3, further comprising:
    receiving, by the light adjustment circuitry, a custom override indication specifying an override light color; and
    adjusting, by the light adjustment circuitry, the light color to the override light color instead of the predetermined color set by the design specification.

5. The method of claim 1, further comprising detecting the hardware configuration for the server by:
    receiving, by the light adjustment circuitry, a hardware component identification signal from a particular hardware component of the server; and Identifying, by the light adjustment circuitry, the hardware configuration of the server according to the hardware component identification signal.

6. A server comprising:
a panel light emitting diode (LED); and
light adjustment circuitry to:
  detect a hardware configuration of the server;
  identify, from the hardware configuration, a server version of the server; and
  adjust a light color of the panel LED by accounting for a lighting variance characteristic of the server version.

7. The server of claim 6, wherein the light adjustment circuitry is to detect the hardware configuration of the server by identifying that a particular hardware component is present in the server.

8. The server of claim 6, wherein the light adjustment circuitry is to detect the hardware configuration of the server by identifying that a particular version of a particular hardware component is present in the server.

9. The server of claim 6, wherein the light adjustment circuitry is to detect the hardware configuration of the server by receiving a hardware component identification signal from a particular hardware component of the server.

10. The server of claim 6, wherein the light adjustment circuitry is to adjust the light color of the panel LED to a predetermined color set by an industrial design specification.

11. A non-transitory machine-readable medium storing executable instructions to:
  detect, by light adjustment circuitry of a server executing the executable instructions, a hardware configuration for a server by identifying that a particular hardware component is present in the server;
  identify, by the light adjustment circuitry, a server version for the server through the detected hardware configuration; and
  adjust; by the light adjustment circuitry, a light color of a panel light of the server to account for a lighting variance characteristic of the server version.

12. The non-transitory machine-readable medium of claim 11, wherein the executable instructions are to identify that the particular hardware component is present in the server by receiving a hardware component identification signal from the particular hardware component of the server.

13. The non-transitory machine-readable medium of claim 11, wherein the executable instructions are to adjust the light color to a predetermined color to match a panel light of a different server.

14. The non-transitory machine-readable medium of claim 11, wherein the executable instructions are to adjust the light color to a predetermined color set by a design specification.

15. The non-transitory machine-readable medium of claim 14, wherein the executable instructions are further to:
  receive, by the light adjustment circuitry, a custom override indication specifying an override light color; and
  adjust, by the light adjustment circuitry, the light color to the override light color instead of the predetermined color set by the design specification.

* * * * *